United States Patent
Ichikawa et al.

(10) Patent No.: US 11,261,512 B2
(45) Date of Patent: *Mar. 1, 2022

(54) FERRITIC STAINLESS STEEL

(71) Applicant: JFE Steel Corporation, Tokyo (JP)

(72) Inventors: Manami Ichikawa, Tokyo (JP); Tetsuyuki Nakamura, Tokyo (JP); Kunio Fukuda, Tokyo (JP); Shin Ishikawa, Tokyo (JP); Reiko Sugihara, Tokyo (JP)

(73) Assignee: JFE Steel Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/325,577

(22) PCT Filed: Aug. 25, 2017

(86) PCT No.: PCT/JP2017/030439
§ 371 (c)(1),
(2) Date: Feb. 14, 2019

(87) PCT Pub. No.: WO2018/043310
PCT Pub. Date: Mar. 8, 2018

(65) Prior Publication Data
US 2019/0177824 A1  Jun. 13, 2019

(30) Foreign Application Priority Data

Sep. 2, 2016  (JP) .............. JP2016-171520
May 26, 2017  (JP) .............. JP2017-104059

(51) Int. Cl.
C22C 38/54 (2006.01)
C21D 9/46 (2006.01)
C22C 38/48 (2006.01)
C22C 38/00 (2006.01)
C21D 8/02 (2006.01)
C21D 6/00 (2006.01)
C22C 38/02 (2006.01)
C22C 38/04 (2006.01)
C22C 38/06 (2006.01)
C22C 38/34 (2006.01)
C22C 38/42 (2006.01)
C22C 38/44 (2006.01)
C22C 38/46 (2006.01)
C22C 38/50 (2006.01)
C22C 38/52 (2006.01)
(Continued)

(52) U.S. Cl.
CPC .............. C22C 38/54 (2013.01); C21D 6/004 (2013.01); C21D 6/008 (2013.01); C21D 8/0205 (2013.01); C21D 8/0226 (2013.01); C21D 8/0236 (2013.01); C21D 9/46 (2013.01); C22C 38/00 (2013.01); C22C 38/001 (2013.01); C22C 38/002 (2013.01); C22C 38/004 (2013.01); C22C 38/005 (2013.01); C22C 38/02 (2013.01); C22C 38/04 (2013.01); C22C 38/06 (2013.01); C22C 38/34 (2013.01); C22C 38/42 (2013.01); C22C 38/44 (2013.01); C22C 38/46 (2013.01); C22C 38/48 (2013.01); C22C 38/50 (2013.01); C22C 38/52 (2013.01); B23K 35/3086 (2013.01); B23K 2101/14 (2018.08); C21D 2211/005 (2013.01)

(58) Field of Classification Search
CPC ...... C21D 6/004; C21D 6/008; C21D 8/0205; C21D 8/0226; C21D 8/0236; C21D 9/46; C22C 38/54; C22C 38/00; C22C 38/001; C22C 38/002; C22C 38/004; C22C 38/005; C22C 38/02; C22C 38/04; C22C 38/06; C22C 38/034; C22C 38/42; C22C 38/44; C22C 38/46; C22C 38/48; C22C 38/50; C22C 38/52; C22C 2101/14; C22C 35/3086; C22C 2211/005
USPC .......................................... 420/38
See application file for complete search history.

(56) References Cited

U.S. PATENT DOCUMENTS 3,617,258 A   11/1971  Terada
7,341,690 B2   3/2008  Miyazaki et al.
(Continued)

FOREIGN PATENT DOCUMENTS

CN   102308012 A   1/2012
CN   103052731 A   4/2013
(Continued)

OTHER PUBLICATIONS

Translation JP-2015096648-A (Year: 2015).*
(Continued)

Primary Examiner — Brian D Walck
Assistant Examiner — D. M. Carda
(74) Attorney, Agent, or Firm — RatnerPrestia

(57) ABSTRACT

Provided is ferritic stainless steel having excellent brazeability and excellent corrosion resistance to condensed water in an environment in which the steel is used for an exhaust heat recovery device or an EGR cooler.

A ferritic stainless steel has a chemical composition containing, by mass %, C: 0.025% or less, Si: 0.40% to 2.0%, Mn: 0.05% to 1.5%, P: 0.05% or less, S: 0.01% or less, Cr: 16.0% to 30.0%, Mo: 0.60% to 3.0%, Ni: 0.10% to 2.5%, Nb: 0.20% to 0.80%, Al: 0.001% to 0.15%, N: 0.025% or less, and the balance being Fe and inevitable impurities, in which relational expressions (1) and (2) below are satisfied.

$$C+N \leq 0.030\% \quad (1),$$

$$2Si+Ni \geq 1.0\% \quad (2),$$

(in relational expressions (1) and (2), C, N, Si, and Ni each denote the contents (mass %) of the corresponding elements).

2 Claims, No Drawings

(51) Int. Cl.
    *B23K 101/14*    (2006.01)
    *B23K 35/30*     (2006.01)

(56) References Cited

U.S. PATENT DOCUMENTS

| | | | |
|---|---|---|---|
| 7,806,993 B2* | 10/2010 | Miyazaki | C22C 38/04 |
| | | | 148/325 |
| 9,157,137 B2 | 10/2015 | Nakamura et al. | |
| 9,587,297 B2 | 3/2017 | Ishii et al. | |
| 10,272,513 B2 | 5/2019 | Hirawawa et al. | |
| 10,450,625 B2 | 10/2019 | Fukuda et al. | |
| 10,458,013 B2 | 10/2019 | Fukuda et al. | |
| 2011/0033731 A1 | 2/2011 | Kawano et al. | |
| 2011/0176953 A1 | 7/2011 | Hiraide et al. | |
| 2011/0280760 A1 | 11/2011 | Matsuhashi et al. | |
| 2014/0069619 A1 | 3/2014 | Hiraide et al. | |
| 2014/0338796 A1 | 11/2014 | Kim et al. | |
| 2015/0292068 A1 | 10/2015 | Teraoka et al. | |
| 2015/0315684 A1 | 11/2015 | Eguchi et al. | |
| 2016/0002760 A1* | 1/2016 | Hiraide | C22C 38/002 |
| | | | 403/272 |
| 2017/0266751 A1 | 9/2017 | Hirasawa et al. | |
| 2017/0275723 A1 | 9/2017 | Abe et al. | |
| 2019/0100821 A1 | 4/2019 | Eguchi et al. | |
| 2019/0106775 A1* | 4/2019 | Nishida | C22C 38/26 |
| 2019/0177824 A1 | 6/2019 | Ichikawa et al. | |
| 2019/0177825 A1* | 6/2019 | Yano | B23K 1/00 |
| 2019/0184437 A1 | 6/2019 | Okabe et al. | |
| 2019/0296369 A1* | 9/2019 | Yano | H01M 8/021 |
| 2019/0305328 A1* | 10/2019 | Yano | C21D 1/76 |
| 2019/0368001 A1* | 12/2019 | Kamo | C22C 38/002 |
| 2019/0376157 A1* | 12/2019 | Kamo | C22C 38/002 |
| 2020/0002779 A1* | 1/2020 | Yoshino | C21D 8/0263 |
| 2020/0080181 A1* | 3/2020 | Ichikawa | C22C 38/02 |
| 2020/0157646 A1* | 5/2020 | Eguchi | C21D 6/008 |
| 2020/0216936 A1* | 7/2020 | Kamo | C21D 8/10 |

FOREIGN PATENT DOCUMENTS

| | | |
|---|---|---|
| CN | 103459636 A | 12/2013 |
| CN | 105008590 A | 10/2015 |
| CN | 105506502 A | 4/2016 |
| EP | 0478790 A1 | 4/1992 |
| EP | 1413640 A1 | 4/2004 |
| EP | 1818421 A1 | 8/2007 |
| EP | 2280090 A1 | 2/2011 |
| EP | 2602351 A1 | 6/2013 |
| EP | 2980274 A1 | 2/2016 |
| JP | H02115346 A | 4/1990 |
| JP | H0570899 A | 3/1993 |
| JP | H05271880 A | 10/1993 |
| JP | 2001181798 A | 7/2001 |
| JP | 2001303202 A | 10/2001 |
| JP | 3253722 B2 | 2/2002 |
| JP | 2002146484 A | 5/2002 |
| JP | 2002212683 A | 7/2002 |
| JP | 2009174040 A | 8/2009 |
| JP | 2009197293 A | 9/2009 |
| JP | 2009228036 A | 10/2009 |
| JP | 2009299182 A | 12/2009 |
| JP | 2010095768 A | 4/2010 |
| JP | 2010121208 A | 6/2010 |
| JP | 2012214880 A | 11/2012 |
| JP | 2013199661 A | 10/2013 |
| JP | 2014145097 A | 8/2014 |
| JP | 2014190664 A | 10/2014 |
| JP | 2015096648 A * | 5/2015 |
| JP | 2016089272 A | 5/2016 |
| KR | 20010061570 A | 7/2001 |
| WO | 2014087648 A1 | 6/2014 |
| WO | 2014097628 A1 | 6/2014 |
| WO | 2016017053 A1 | 2/2016 |

OTHER PUBLICATIONS

International Search Report and Written Opinion for International Application No. PCT/JP2017/030439, dated Oct. 24, 2017—9 pages.
Japanese Office Action for Japanese Application No. 2017-562092, dated Dec. 9, 2019 with Concise Statement of Relevance of Office Action, 4 pages.
Extended European Search Report for European Application No. 17 846 315.4, dated Jul. 30, 2019, 10 pages.
Korean Office Action for Korean Application No. 10-2019-7004487, dated Jun. 1, 2020 with Concise Statement of Relevance of Office Action, 5 pages.
Chinese Office Action with Search Report for Chinese Application No. 201780050064.4, dated Apr. 26, 2020, 9 pages.
Non Final Office Action for U.S. Appl. No. 16/470,343, dated Aug. 6, 2020, 21 pages.
Notice of Allowance for U.S. Appl. No. 16/307,238, dated May 19, 2020, 9 pages.
Non Final Office Action for U.S. Appl. No. 16/615,883, dated Aug. 7, 2020, 28 pages.
Non Final Office Action for U.S. Appl. No. 16/087,486, dated May 7, 2020, 17 pages.
Non Final Office Action for U.S. Appl. No. 10/512,782, dated May 30, 2007, 7 pages.
Final Office Action for U.S. Appl. No. 10/512,782, dated Dec. 26, 2007, 6 pages.
Final Office Action for U.S. Appl. No. 10/512,782, dated Aug. 18, 2008, 7 pages.
Non Final Office Action for U.S. Appl. No. 10/512,782, dated Mar. 13, 2009, 7 pages.
Final Office Action for U.S. Appl. No. 10/512,782, dated Oct. 15, 2009, 9 pages.
Non Final Office Action for U.S. Appl. No. 10/512,782, dated Mar. 17, 2010, 5 pages.
Final Office Action for U.S. Appl. No. 10/512,782, dated May 24, 2010, 4 pages.
Chinese Office Action for Chinese Application No. 201780050064.4, dated Jan. 11, 2021 with Concise Statement of Relevance of Office Action, 9 pages.
Final Office Action for U.S. Appl. No. 16/325,575, dated Mar. 23, 2021, 14 pages.
Final Office Action for U.S. Appl. No. 16/615,883, dated Jan. 22, 2021, 21 pages.
Non Final Office Action for U.S. Appl. No. 16/076,138, dated Oct. 28, 2020, 11 pages.
Non Final Office Action for U.S. Appl. No. 16/307,578, dated Oct. 5, 2020, 7 pages.
Non Final Office Action for U.S. Appl. No. 16/325,575, dated Sep. 11, 2020, 17 pages.
Non Final Office Action for U.S. Appl. No. 16/480,785, dated Jan. 11, 2021, 12 pages.
Non Final Office Action for U.S. Appl. No. 16/615,883, dated Jun. 24, 2021, 27 pages.
Non Final Office Action for U.S. Appl. No. 16/325,575, dated Aug. 26, 2021, 7 pages.
Chinese Office Action for Chinese Application No. 201780050064.4, dated Jun. 30, 2021 with Concise Statement of Relevance of Office Action, 4 pages.

* cited by examiner

FERRITIC STAINLESS STEEL

CROSS REFERENCE TO RELATED APPLICATIONS

This is the U.S. National Phase application of PCT/JP2017/030439, filed Aug. 25, 2017, which claims priority to Japanese Patent Application No. 2016-171520, filed Sep. 2, 2016 and Japanese Patent Application No. 2017-104059, filed May 26, 2017, the disclosures of each of these applications being incorporated herein by reference in their entireties for all purposes.

FIELD OF THE INVENTION

The present invention relates to ferritic stainless steel which is used in an environment of exhaust gas condensed water in an automobile. More specifically, the present invention relates to ferritic stainless steel which is used, for example, for an exhaust heat recovery device or an exhaust gas recirculation device such as an exhaust gas recirculation (EGR) cooler.

BACKGROUND OF THE INVENTION

Nowadays, in the field of automobiles, exhaust gas emission control is tightened, and there is a demand for a further improvement in fuel efficiency. Therefore, there is a growing trend toward applying heat exchangers such as an exhaust heat recovery device and an EGR cooler to automobiles.

An exhaust heat recovery device is a device with which exhaust gas heat is recovered and reused and which is mounted mainly on hybrid automobiles. In the case of a system utilizing an exhaust heat recovery device, fuel efficiency and room-heating performance are improved as a result of accelerating engine warming-up by transferring heat from exhaust gas to engine-cooling water through a heat exchanger.

In addition, an EGR cooler is a device with which exhaust gas is recirculated. In the case of a system utilizing an EGR cooler, the combustion temperature of an engine is decreased to inhibit the generation of NOx by cooling high-temperature exhaust gas on the exhaust side through a heat exchanger, and by returning the cooled exhaust gas into the engine.

The heat exchange unit of such an exhaust heat recovery device or an EGR cooler is exposed to a severe corrosive environment due to generated condensed water. In the heat exchange unit, since stainless steel is interposed between exhaust gas and cooling water, leakage of the cooling water occurs when pitting occurs due to corrosion. Therefore, there is a demand for corrosion resistance to condensed water.

Patent Literature 1 discloses austenitic stainless steel for an EGR cooler and exhaust heat recovery device in the case where a fuel having high S concentration due to insufficient refining is used. However, there is a problem of high cost as a result of austenitic stainless steel containing a large amount of Ni. And there is a problem of low thermal fatigue resistance at a high temperature, that is, fatigue resistance in an environment in which the steel is subjected to severe vibration at a high temperature as in the case where the steel is used as, for example, parts around an exhaust manifold.

Therefore, consideration is given to using steel other than austenitic stainless steel for heat exchange units of an exhaust heat recovery device and an EGR cooler.

For example, Patent Literature 2 discloses an exhaust heat recovery device for an automobile constituted of ferritic stainless steel as a material. In this case, sufficient pitting corrosion resistance and sufficient crevice corrosion resistance are achieved by adding Mo to 18 mass % or more of Cr contained stainless steel in an environment in which exhaust gas is condensed and vaporized.

In addition, since brazing is used for joining the heat exchange unit or the like in the EGR cooler described above, such members are desired to have not only improved corrosion resistance to condensed water but also excellent brazeability.

From such a viewpoint, for example, Patent Literature 3 discloses ferritic stainless steel for an EGR cooler. In this case, excellent brazeability and excellent corrosion resistance to condensed water in exhaust gas are achieved by adding Cr and Cu so that the relationship $Cr+2.3Cu \geq 18$ is satisfied.

Patent Literature 4 discloses ferritic stainless steel for an exhaust heat recovery device having corrosion resistance to condensed water in exhaust gas after brazing has been performed. In this case, the steel is characterized in that the cation fraction in a layer formed after brazing and heating is specified from the viewpoint of corrosion resistance after the brazing.

PATENT LITERATURE

PTL 1: Japanese Unexamined Patent Application Publication No. 2013-199661

PTL 2: Japanese Unexamined Patent Application Publication No. 2009-228036

PTL 3: Japanese Unexamined Patent Application Publication No. 2010-121208

PTL 4: Japanese Unexamined Patent Application Publication No. 2012-214880

SUMMARY OF THE INVENTION

However, in the case of the stainless steels according to Patent Literature 2 through Patent Literature 4, there may be a case of insufficient corrosion resistance to condensed water when a test is conducted by simulating a practical environment in which generation, vaporization, and heating of condensed water are cyclically repeated. Like this, in the case of the conventional techniques, it may be said that desired corrosion resistance to condensed water has not yet been achieved with sufficient brazeability being achieved at the same time.

Therefore, an object according to aspects of the present invention is to provide ferritic stainless steel having excellent brazeability and excellent corrosion resistance to condensed water in an environment in which the steel is used for an exhaust heat recovery device or an EGR cooler.

Here, the expression "excellent brazeability" refers to a case where, when a brazing treatment is performed by applying 1.2 g of a brazing filler metal, that is, BNi-5(Ni-19Cr-10Si) to one end surface of overlapped two steel sheets and by heating the steel sheets at a temperature of 1170° C. for 600 seconds in a vacuum environment of $10^{-2}$ Pa, the penetration distance of the brazing filler metal is 50% or more of the lapping length of the two steel sheets.

In addition, the expression "excellent corrosion resistance to condensed water" refers to a case where, when a unit test cycle in which a whole test piece is subjected to full immersion in a solution containing 200 ppm $Cl^-$ +600 ppm $SO_4^{2-}$ and having a pH of 8.0, holding at a temperature of 80° C., immersion for 24 hours while the solution is vaporized in 24 hours, and being held in a furnace at a temperature of 250° C. for 24 hours, is performed four times (hereinafter, may be referred to as "condensed water corrosion test"), the maximum corrosion depth is less than 100 μm.

The present inventors conducted the condensed water corrosion test described above and found that it is possible to achieve excellent corrosion resistance to condensed water by containing an appropriate amount of Si in addition to Cr, Mo, Ni, C, and N. Moreover, it was found that it is also possible to achieve sufficient brazeability by controlling the Al content.

The subject matter of aspects of the present invention, which are intended to solve the problems described above, is as follows.

[1] A ferritic stainless steel having a chemical composition containing, by mass %,
C: 0.025% or less,
Si: 0.40% to 2.0%,
Mn: 0.05% to 1.5%,
P: 0.05% or less,
S: 0.01% or less,
Cr: 16.0% to 30.0%,
Mo: 0.60% to 3.0%,
Ni: 0.10% to 2.5%,
Nb: 0.20% to 0.80%,
Al: 0.001% to 0.15%,
N: 0.025% or less, and
the balance being Fe and inevitable impurities,
in which relational expressions (1) and (2) below are satisfied.

$$C+N \leq 0.030\% \quad (1),$$

$$2Si+Ni \geq 1.0\% \quad (2),$$

(in relational expressions (1) and (2), C, N, Si, and Ni each denote the contents (mass %) of the corresponding elements).

[2] The ferritic stainless steel according to item [1] above, in which the chemical composition further contains, by mass %, one, two, or all selected from
Cu: 0.01% to 1.0%,
W: 0.01% to 1.0%,
Co: 0.01% to 1.0%.

[3] The ferritic stainless steel according to item [1] or [2] above, in which the chemical composition further contains, by mass %, one, two, or more selected from
Ti: 0.01% to 0.10%,
V: 0.01% to 0.50%,
Zr: 0.01% to 0.30%,
B: 0.0003% to 0.005%,
Ca: 0.0003% to 0.003%,
Mg: 0.0003% to 0.003%,
one or more REMs (rare earth metals): 0.001% to 0.10%.

[4] The ferritic stainless steel according to any one of items [1] to [3] above, in which the steel is steel for an exhaust heat recovery device or exhaust gas recirculation device of an automobile.

According to aspects of the present invention, it is possible to provide ferritic stainless steel having excellent brazeability and excellent corrosion resistance to condensed water in the case where the steel is used for an automobile part such as an exhaust heat recovery device or an EGR cooler which is exposed to a condensed water corrosive environment.

DETAILED DESCRIPTION OF EMBODIMENTS OF THE INVENTION

Hereafter, an embodiment of the present invention will be described in detail.

The portion on the exhaust gas side of the heat exchange unit of an exhaust heat recovery device and an EGR cooler is, like a conventional muffler, exposed to an environment in which the condensation and vaporization of exhaust gas are cyclically repeated. Since generated condensed water is heated by exhaust gas, there is an increase in the concentration of ion species and a decrease in pH as moisture is vaporized, which results in the corrosion of stainless steel being accelerated. Nowadays, since exhaust gas is diversifying due to fuel diversification, a corrosive environment is supposed to become severe, because, for example, there is an increase in the amounts of chloride ions and sulfate ions, which have large influence on corrosion resistance, and there is a change in the pH of the exhaust gas from neutrality to weakly acidity.

In view of the situation described above, the present inventors diligently conducted investigations regarding improvement of the corrosion resistance to condensed water of stainless steel in an environment of exhaust gas condensed water.

As a result, it was found that, to obtain stainless steel having excellent corrosion resistance to condensed water, containing an appropriate amount of Si in addition to Cr, Mo, Ni, C, and N whose contents are controlled to be within predetermined ranges is effective.

Corrosion due to condensed water is a kind of pitting corrosion. In accordance with aspects of the present invention, corrosion resistance to condensed water is improved by suppressing the generation of pitting corrosion, by decreasing the growth rate of pitting corrosion, and by stopping the growth of pitting corrosion. Regarding the first item, that is, to suppress the generation of pitting corrosion, the suppressing effect is significantly improved by containing Cr and Mo and by further containing an appropriate amount of Si. Regarding the second item, that is, to decrease the growth rate of pitting corrosion, an appropriate amount of Ni is contained. Moreover, regarding the third item, that is, to stop the growth of pitting corrosion, the growth is effectively stopped by containing Cr and Mo and by containing appropriate amounts of Si and Ni.

Moreover, it was found that it is possible to achieve sufficient brazeability by controlling the content of Al.

It was found that there is a significant improvement in corrosion resistance to condensed water with sufficient brazeability being achieved through the various contributions of the various elements to each process described above, which resulted in the completion of aspects of the present invention.

The ferritic stainless steel according to aspects of the present invention based on the knowledge described above has a chemical composition containing, by mass %, C: 0.025% or less, Si: 0.40% to 2.0%, Mn: 0.05% to 1.5%, P: 0.05% or less, S: 0.01% or less, Cr: 16.0% to 30.0%, Mo: 0.60% to 3.0%, Ni: 0.10% to 2.5%, Nb: 0.20% to 0.80%, Al: 0.001% to 0.15%, N: 0.025% or less, and the balance being Fe and inevitable impurities, in which relational expressions (1) and (2) below are satisfied, excellent brazeability, and excellent corrosion resistance to condensed water in the case where the steel is used for an automobile part such as an exhaust heat recovery device or an EGR cooler which is exposed to a condensed water corrosive environment.

$$C+N \leq 0.030\% \quad (1),$$

$$2Si+Ni \geq 1.0\% \quad (2),$$

(in relational expressions (1) and (2), C, N, Si, and Ni each denote the contents (mass %) of the corresponding elements).

Hereafter, first, the chemical composition of the ferritic stainless steel according to aspects of the present invention will be described. Here, "%" used when describing the contents of the constituents refers to "mass %", unless otherwise noted.

C: 0.025% or Less

C is an element which is inevitably contained in steel. There is an improvement in strength in the case where the C content is high, and there is an improvement in workability in the case where the C content is low. It is preferable that the C content be 0.001% or more to improve strength. On the other hand, in the case where the C content is more than 0.025%, there is a significant deterioration in workability, and there is a tendency for corrosion resistance to condensed water to deteriorate due to local Cr depletion as a result of Cr carbides being precipitated. Therefore, the C content is set to be 0.025% or less, preferably 0.020% or less, more preferably 0.015% or less, or even more preferably 0.010% or less. In addition, it is preferable that the C content be 0.003% or more or more preferably 0.004% or more.

Si: 0.40% to 2.0%

Si is an element which is important for improving corrosion resistance to condensed water in accordance with aspects of the present invention. Such an effect is obtained in the case where the Si content is 0.40% or more. It is preferable that the Si content be more than 0.60% in the case where more excellent corrosion resistance to condensed water is required. However, there is a, deterioration in workability in the case where the Si content is more than 2.0%. Therefore, the Si content is set to be 0.40% to 2.0%. It is preferable that the Si content be more than 0.60%, more preferably 0.80% or more, or even more preferably 1.00% or more. In addition, it is preferable that the Si content be 1.80% or less, more preferably. 1.60% or less, or even more preferably 1.40% or less.

Mn: 0.05% to 1.5%

Mn has a deoxidation effect, and such an effect is obtained in the case where the Mn content is 0.05% or more. However, in the case where the Mn content is more than 1.5%, there is a deterioration in workability due to solid solution strengthening. In addition, in the case where the Mn content is more than 1.5%, since the precipitation of MnS, which becomes a starting point at which corrosion occurs, is promoted, there is a deterioration in corrosion resistance to condensed water. Therefore, the Mn content is set to be 0.05% to 1.5%. It is preferable that the Mn content be 0.10% or more. In addition, it is preferable that the Mn content be 0.50% or less or more preferably 0.30% or less.

P: 0.05% or Less

P is an element which is inevitably contained in steel, and, in the case where the P content is more than 0.05%, there is a deterioration in weldability, and there is a tendency for grain boundary corrosion to occur. Therefore, the P content is limited to be 0.05% or less, preferably 0.04% or less, or more preferably 0.03% or less.

S: 0.01% or Less

S is an element which is inevitably contained in steel, and, in the case where the S content is more than 0.01%, since the precipitation of MnS is promoted, there is a deterioration in corrosion resistance to condensed water. Therefore, the S content is set to be 0.01% or less, preferably 0.008% or less, or more preferably 0.005% or less.

Cr: 16.0% to 30.0%

Cr is an element which is important for achieving sufficient corrosion resistance to condensed water. In the case where the Cr content is less than 16.0%, it is not possible to achieve sufficient corrosion resistance to condensed water. On the other hand, in the case where the Cr content is more than 30.0%, there is a deterioration in workability and manufacturability. Therefore, the Cr content is set to be 16.0% to 30.0%. It is preferable that the Cr content be 18.0% or more, more preferably 19.0% or more, or even more preferably 20.5% or more. In addition, it is preferable that the Cr content be 24.0% or less, more preferably 23.0% or less, or even more preferably 22.0% or less.

Mo: 0.60% to 3.0%

Mo is effective for improving corrosion resistance to condensed water by stabilizing the passivation film of stainless steel. In the case of an exhaust heat recovery device or an EGR cooler, Mo is effective for preventing inner-surface corrosion due to condensed water and outer-surface corrosion due to a snow melting agent or the like. Moreover, since Mo is effective for improving thermal fatigue resistance, Mo is an element which is particularly preferable when used for an EGR cooler which is installed immediately below an exhaust manifold. Such effects are obtained in the case where the Mo content is 0.60% or more. However, since Mo is an expensive element, there is an increase in cost. Moreover, in the case where the Mo content is more than 3.0%, there is a deterioration in workability. Therefore, the Mo content is set to be 0.60% to 3.0%. It is preferable that the Mo content be 0.80% or more, more preferably 1.00% or more, even more preferably 1.20% or more, or even much more preferably 1.50% or more. It is preferable that the Mo content be 2.50% or less or more preferably 2.00% or less.

Ni: 0.10% to 2.5%

Ni is an element which contributes to an improvement in corrosion resistance to condensed water and toughness in the case where the Ni content is 0.10% or more. However, in the case where the Ni content is more than 2.5%, stress corrosion cracking sensitivity becomes higher. Therefore, the Ni content is set to be 0.10% to 2.5%. It is preferable that the Ni content be 0.50% or more, more preferably more than 0.80%, even more preferably 1.00% or more, even much more preferably 1.20% or more, or particularly preferably 1.50% or more. In addition, in the case where the content of Si, which is effective for improving corrosion resistance to condensed water, is 0.60% or less, it is preferable that the Ni content be more than 0.80% to achieve sufficient condensed water corrosion resistance.

Nb: 0.20% to 0.80%

Nb is an element which inhibits a deterioration in corrosion resistance to condensed water due to the precipitation of Cr carbonitrides as a result of preferential combination with C and N. In addition, Nb is effective for improving thermal fatigue resistance by improving high-temperature strength. Such effects are obtained in the case where the Nb content is 0.20% or more. On the other hand, in the case where the Nb content is more than 0.80%, there is a deterioration in toughness. Therefore, the Nb content is set to be 0.20% to 0.80%. It is preferable that the Nb content be 0.25% or more. In addition, it is preferable that the Nb content be 0.60% or less, more preferably 0.50% or less, or even more preferably 0.40% or less.

Al: 0.001% to 0.15%

Al is an element which is effective for deoxidation, and such an effect is obtained in the case where the Al content is 0.001% or more. On the other hand, since there is a deterioration in brazeability in the case where the Al content is more than 0.15%, the Al content is set to be 0.15% or less.

Therefore, the Al content is set to be 0.001% to 0.15%. It is preferable that the Al content be 0.10% or less, more preferably 0.050% or less, even more preferably 0.025% or less, even much more preferably 0.015% or less, particularly preferably 0.010% or less, or most preferably 0.008% or less.

N: 0.025% or Less

N is an element which is, like C, inevitably contained in steel and which is effective for improving the strength of steel through solid solution strengthening. Such an effect is obtained in the case where the N content is 0.001% or more. On the other hand, in the case where N is precipitated in the form of Cr nitrides as a result of the N content being more than 0.025%, there is a deterioration in corrosion resistance to condensed water. Therefore, the N content is set to be 0.025% or less. It is preferable that the N content be 0.020% or less, more preferably 0.015% or less, or even more preferably 0.010% or less. In addition, it is preferable that the N content be 0.001% or more, more preferably 0.003% or more, or even more preferably 0.005% or more.

$$C+N \leq 0.030\% \qquad (1),$$

(in relational expression (1), C and N each denote the contents (mass %) of the corresponding elements)

In the case where the contents of C and N are excessively high, there is a deterioration in corrosion resistance to condensed water and workability. Therefore, while the contents of C and N are each controlled to be within the ranges described above, C+N (the sum of the C content and the N content) is set to be 0.030% or less, preferably 0.025% or less, or even more preferably 0.020% or less.

$$2Si+Ni \geq 1.0\% \qquad (2),$$

(in relational expression (2), Si and Ni each denote the contents (mass %) of the corresponding elements)

As described above, in accordance with aspects of the present invention, the contents of Si and Ni are each controlled to be within the predetermined ranges to improve corrosion resistance to condensed water. From the results of additional investigations conducted by the present inventors, it was found that, in the case where 2Si+Ni (the sum of the Si content multiplied by 2 and the Ni content) is less than 1.0%, it is not possible to achieve the desired corrosion resistance to condensed water. Therefore, in accordance with aspects of the present invention, while the contents of Si and Ni are each controlled to be within the ranges described above, 2Si+Ni is set to be 1.0% or more or preferably 1.5% or more.

In the case of the ferritic stainless steel according to aspects of the present invention, the remainder is Fe and inevitable impurities.

The ferritic stainless steel according to aspects of the present invention may further contain one, two, or all selected from Cu, W, and Co in the amounts described below in addition to the elements described above.

Cu: 0.01% to 1.0%

Cu is an element which is effective for improving corrosion resistance to condensed water. Such an effect is obtained in the case where the Cu content is 0.01% or more. On the other hand, in the case where the Cu content is more than 1.0%, there may be a deterioration in hot workability. Therefore, in the case where Cu is contained, it is preferable that the Cu content be 0.01% to 1.0%. It is more preferable that the Cu content be 0.05% or more. In addition, it is more preferable that the Cu content be 0.50% or less.

W: 0.01% to 1.0%

W is, like Mo, effective for improving corrosion resistance to condensed water. Such an effect is obtained in the case where the W content is 0.01% or more. On the other hand, in the case where the W content is more than 1.0%, there may be a deterioration in manufacturability. Therefore, in the case where W is added, it is preferable that the W content be 0.01% to 1.0%. It is more preferable that the W content be 0.50% or less.

Co: 0.01% to 1.0%

Co is an element which improves corrosion resistance to condensed water and toughness. Such effects are obtained in the case where the Co content is 0.01% or more. On the other hand, in the case where the Co content is more than 1.0%, there may be a deterioration in manufacturability. Therefore, in the case where Co is contained, it is preferable that the Co content be 0.01% to 1.0%. It is more preferable that the Co content be 0.02% or more or even more preferably 0.04% or more. In addition, it is more preferable that the Co content be 0.50% or less or even more preferably 0.20% or less.

The ferritic stainless steel according to aspects of the present invention may further contain one, two, or more selected from Ti, V, Zr, B, Ca, Mg, and REM in the amounts described below.

Ti: 0.01% to 0.10%

Ti is effective for preventing sensitization from occurring by combining with C and N contained in steel. Such an effect is obtained in the case where the Ti content is 0.01% or more. On the other hand, since Ti is an element which is active against oxygen, in the case where the Ti content is more than 0.10%, Ti may deteriorates brazeability by forming a dense and continuous Ti-oxide layer on the surface of steel when a brazing treatment is performed. Therefore, it is preferable that the Ti content be 0.01% to 0.10%. It is more preferable that the Ti content be 0.02% or more or even more preferably 0.03% or more. It is more preferable that the Ti content be 0.05% or less or even more preferably 0.04% or less.

V: 0.01% to 0.50%

V is, like Ti, effective for preventing sensitization from occurring by combining with C and N contained in steel. Such an effect is obtained in the case where the V content is 0.01% or more. On the other hand, in the case where the V content is more than 0.50%, there may be a deterioration in workability. Therefore, in the case where V is contained, it is preferable that the V content be 0.01% to 0.50%. It is more preferable that the V content be 0.03% or more or even more preferably 0.05% or more. In addition, it is more preferable that the V content be 0.40% or less or even more preferably 0.25% or less.

Zr: 0.01% to 0.30%

Zr is effective for inhibiting sensitization from occurring by combining with C and N. Such an effect is obtained in the case where the Zr content is 0.01% or more. On the other hand, in the case where the Zr content is more than 0.30%, there is a deterioration in workability, and there may be an increase in cost due to Zr being a very expensive element. Therefore, in the case where Zr is contained, it is preferable that the Zr content be 0.01% to 0.30%. It is more preferable that the Zr content be 0.05% or more. In addition, it is more preferable that the Zr content be 0.20% or less.

B: 0.0003% to 0.005%

B is an element which improves secondary work brittleness. Such an effect is obtained in the case where the B content is 0.0003% or more. On the other hand, in the case where the B content is more than 0.005%, there may be a deterioration in ductility due to solid solution strengthening. Therefore, in the case where B is contained, it is preferable that the B content be 0.0003% to 0.005%. It is more preferable that the B content be 0.0005% or more. In addition, it is more preferable that the B content be 0.0030% or less.

Ca: 0.0003% to 0.003%

Ca improves weldability by improving the weld penetration of a weld. Such an effect is obtained in the case where the Ca content is 0.0003% or more. On the other hand, in the case where the Ca content is more than 0.003%, there may be a deterioration in condensed water corrosion resistance as a result of combining with S to form CaS. Therefore, in the case where Ca is contained, it is preferable that the Ca content be 0.0003% to 0.003%. It is more preferable that the Ca content be 0.0005% or more. In addition, it is more preferable that the Ca content be 0.0020% or less.

Mg: 0.0003% to 0.003%

Since Mg is an element which is effective for, for example, deoxidation in a refining process and which is effective for improving workability and toughness by refining a microstructure, Mg may be contained as needed in an amount of 0.003% or less. In the case where Mg is contained, it is preferable that the Mg content be 0.0003% or more, because this results in such effects being stably obtained. That is, in the case where Mg is contained, it is preferable that the Mg content be 0.0003% to 0.003%. It is more preferable that the Mg content be 0.0020% or less.

REMs (Rare Earth Metals): 0.001% to 0.10%

Rare-earth metals (REMs) inhibits the formation of a Cr-depleted region immediately beneath temper color in a weld zone by inhibiting the generation of oxidized scale as a result of improving oxidation resistance. Such an effect is obtained in the case where the REMs content be 0.001% or more. On the other hand, in the case where the REMs content is more than 0.10%, there is a deterioration in manufacturability in, for example, a pickling process, and there is an increase in cost. Therefore, in the case where REM is contained, it is preferable that the REMs content be 0.001% to 0.10%.

Hereafter, the method for manufacturing the ferritic stainless steel according to aspects of the present invention will be described.

There is no particular limitation on the method usable for manufacturing the ferritic stainless steel according to aspects of the present invention, and a commonly usable method for manufacturing ferritic stainless steel can preferably be used. For example, the stainless steel may be manufactured by preparing molten steel having the above-described chemical composition according to aspects of the present invention by using a known melting furnace such as a converter or an electric furnace, by optionally performing secondary refining such as ladle refining or vacuum refining, by manufacturing a steel piece (slab) by using a continuous casting method or an ingot casting-slabbing method, and by manufacturing a cold-rolled and annealed steel sheet from the steel piece through a manufacturing process including, for example, hot rolling, hot-rolled-sheet annealing, pickling, cold rolling, finish annealing, and pickling. The above-mentioned cold rolling may be performed once, twice, or more with an intermediate annealing process being interposed between cold rolling processes, and each process of cold rolling, finish annealing, and pickling may be repeated. Moreover, annealing of hot-rolled-sheet may be omitted, and skin pass rolling may be performed after cold rolling or finish annealing in the case where the surface gloss or surface roughness of a steel sheet is required to be controlled.

Preferable manufacturing conditions in the manufacturing method described above will be described.

In the steel-making process in which molten steel is prepared, it is preferable that steel having the above-described chemical composition containing the indispensable constituents and the optional constituents, which are added as needed, be prepared by performing secondary refining by using, for example, a VOD method on molten steel melted by using, for example, a converter or an electric furnace. Although the prepared molten steel may be made into steel by using a known method, it is preferable that a continuous casting method be used from the viewpoint of productivity and product quality. The steel is then heated preferably to a temperature of 1050° C. to 1250° C. and subjected to hot rolling to manufacture a hot-rolled steel sheet having a desired thickness. It is needless to say that a product other than a sheet may also be processed by hot working. It is preferable that the above-described hot-rolled steel sheet be subjected to continuous annealing at a temperature of 900° C. to 1150° C., as needed, and then subjected to descaling by performing, for example, pickling, to manufacture a hot-rolled product. Here, scale may be removed, as needed, by performing shot blasting before pickling is performed.

Moreover, the above-described hot-rolled and annealed steel sheet may be made into a cold-rolled product through processes including a cold rolling process. In this case, although the number of cold rolling operation may be one, cold rolling may be performed twice or more with an intermediate annealing process being interposed between cold rolling processes is performed from the viewpoint of productivity and required product quality. It is preferable that the total rolling reduction ratio be 60% or more or more preferably 70% or more when cold rolling is performed once, twice, or more. It is preferable that the cold-rolled steel sheet be then subjected to continuous annealing (finish annealing) at a temperature of 900° C. to 1150° C. or more preferably 950° C. to 1150° C. and subjected to pickling to obtain a cold-rolled product. Here, pickling may be omitted by performing bright annealing in continuous annealing. Moreover, the shape, surface roughness, and material properties of a steel sheet may be controlled by performing, for example, skin pass rolling depending on intended use after finish annealing has been performed.

The above-described ferritic stainless steel according to aspects of the present invention can preferably be used for the exhaust heat recovery device or exhaust gas recirculation device such as an EGR cooler of an automobile.

Examples

Hereafter, aspects of the present invention will be described in detail on the basis of examples.

Hot-rolled steel sheets having a thickness of 4.0 mm were manufactured by preparing, in a vacuum melting furnace, molten steels having the chemical compositions corresponding to Nos. 1 through 21 and 23 through 45 given in Tables 1 and 2 and by performing hot rolling after heating at a temperature of 1100° C. to 1200° C. for one hour. The hot-rolled steel sheets were subjected to hot-rolled-sheet annealing at a temperature of 950° C. to 1100° C. followed by descaling and cold rolling so as to have a thickness of 1.0 mm. Cold-rolled and annealed steel sheets obtained by performing finish annealing at a temperature of 950° C. to 1100° C. were polished by using #600 emery paper and degreased by using acetone to obtain samples to be used in the following tests.

<Condensed Water Corrosion Resistance>

Corrosion resistance to condensed water was evaluated by conducting a cyclic test simulating a practical environment. A sample of 25 mm×100 mm was cut out of the cold-rolled and annealed steel sheet and used in the test. With reference to the examples of the analysis results of condensed water collected from the exhaust heat recovery devices of actual automobiles, only chloride ions and sulfate ions, which particularly contribute to corrosion, were used in a testing solution. After a solution containing 200 ppm of $Cl^-$+600 ppm of $SO_4^{2-}$ had been prepared by using hydrochloric acid and sulfuric acid as reagents, the pH was controlled to be 8.0 by using an ammonia aqueous solution. The sample was immersed in the above-described solution, whose temperature was controlled to be constantly 80° C., and the solution is vaporized in 24 hours with the sample being immersed. Such an immersion test process was performed five times. Subsequently, the sample was heated and held in a furnace having a temperature of 250° C. for 24 hours. Such an immersion-holding test, which constitutes 1 cycle, was performed four cycles. After the test had been performed, corrosion products were removed, and corrosion depth was then determined by using a 3D-microscope. A case where the maximum corrosion depth was less than 80 μm was judged as ⊙ (passed, particularly excellent), a case where the maximum corrosion depth was 80 μm or more and less than 100 μm was judged as ○ (passed), and a case where the maximum corrosion depth was 100 μm or more was judged as x (failed).

<Brazeability>

Brazeability was evaluated on the basis of the penetration of a brazing filler metal through a gap. Two samples of 30 mm square and of 25 mm×30 mm were cut out of each of the cold-rolled and annealed steel sheets, and the two samples were overlapped and clamped by using a clamp tool with a constant torque force of 170 kgf. A brazing treatment was performed in a vacuum environment of $10^{-2}$ Pa by applying 1.2 g of a brazing filler metal, that is, BNi-5(Ni-19Cr-10Si), to one end surface of the overlapped two steel sheets.

In the heat treatment, after heating at a heating rate of 10° C./s, soaking 1 (to homogenize the temperature of the whole sample) at a temperature of 1060° C. for 1800 seconds, heating at a heating rate of 10° C./s, and soaking 2 (to practically perform brazing at a temperature equal to or higher than the melting point of the brazing filler metal) at a temperature of 1170° C. for 600 seconds had been performed in this order, the sample was left in the furnace so as to be cooled to a temperature of 200° C., and the external air (atmospheric air) was then introduced into the furnace. After the brazing treatment had been performed, the penetration distance of the brazing filler metal between steel sheets was determined by performing visual observation at the lateral side of the overlapped steel sheets, and judgement was conducted on the basis of the following criteria. A case where the penetration distance of the brazing filler metal was 50% or more of the lapping length of the two steel sheets was judged as ○ (passed), and a case where the penetration distance of the brazing filler metal was less than 50% of the lapping length of the two steel sheets was judged as x (failed).

TABLE 1

| Steel No. | Chemical Composition (mass %) | | | | | | | | | | | |
|---|---|---|---|---|---|---|---|---|---|---|---|---|
| | C | Si | Mn | P | S | Cr | Mo | Ni | Nb | Al | N | C + N |
| 1 | 0.005 | 0.81 | 0.11 | 0.029 | 0.001 | 19.05 | 1.84 | 0.66 | 0.33 | 0.008 | 0.007 | 0.012 |
| 2 | 0.007 | 1.89 | 0.22 | 0.024 | 0.001 | 21.04 | 1.69 | 0.52 | 0.22 | 0.018 | 0.009 | 0.016 |
| 3 | 0.008 | 0.42 | 0.15 | 0.036 | 0.003 | 19.32 | 1.92 | 0.89 | 0.31 | 0.014 | 0.005 | 0.013 |
| 4 | 0.015 | 0.96 | 0.13 | 0.037 | 0.002 | 18.27 | 1.78 | 2.43 | 0.41 | 0.010 | 0.004 | 0.019 |
| 5 | 0.006 | 1.10 | 0.87 | 0.021 | 0.002 | 18.76 | 2.41 | 0.13 | 0.36 | 0.025 | 0.008 | 0.014 |
| 6 | 0.008 | 1.31 | 0.35 | 0.031 | 0.003 | 18.98 | 1.92 | 1.02 | 0.23 | 0.009 | 0.007 | 0.015 |
| 7 | 0.005 | 0.66 | 0.21 | 0.028 | 0.003 | 20.05 | 0.61 | 0.67 | 0.28 | 0.015 | 0.006 | 0.011 |
| 8 | 0.007 | 0.78 | 0.15 | 0.025 | 0.001 | 27.58 | 1.53 | 0.46 | 0.31 | 0.009 | 0.010 | 0.017 |
| 9 | 0.010 | 0.52 | 0.47 | 0.029 | 0.002 | 16.33 | 1.98 | 0.31 | 0.21 | 0.014 | 0.008 | 0.018 |
| 10 | 0.011 | 0.44 | 0.30 | 0.037 | 0.002 | 18.96 | 1.79 | 0.14 | 0.53 | 0.012 | 0.009 | 0.020 |
| 11 | 0.008 | 0.71 | 0.17 | 0.030 | 0.002 | 18.27 | 1.85 | 1.52 | 0.35 | 0.007 | 0.011 | 0.019 |
| 12 | 0.012 | 0.80 | 0.26 | 0.027 | 0.002 | 25.88 | 1.88 | 0.92 | 0.63 | 0.011 | 0.013 | 0.025 |
| 13 | 0.009 | 0.45 | 0.14 | 0.029 | 0.002 | 19.06 | 1.85 | 1.83 | 0.31 | 0.008 | 0.007 | 0.016 |
| 14 | 0.005 | 0.68 | 0.28 | 0.033 | 0.003 | 20.51 | 1.92 | 0.81 | 0.24 | 0.013 | 0.006 | 0.011 |
| 15 | 0.012 | 1.48 | 0.33 | 0.018 | 0.002 | 16.86 | 1.11 | 1.67 | 0.33 | 0.016 | 0.007 | 0.019 |
| 16 | 0.009 | 1.01 | 1.21 | 0.022 | 0.002 | 18.96 | 1.83 | 0.26 | 0.30 | 0.009 | 0.004 | 0.013 |
| 17 | 0.015 | 1.22 | 0.20 | 0.036 | 0.001 | 23.12 | 1.91 | 1.23 | 0.36 | 0.008 | 0.008 | 0.023 |
| 18 | 0.004 | 0.78 | 0.12 | 0.028 | 0.004 | 21.33 | 1.87 | 1.38 | 0.28 | 0.005 | 0.011 | 0.015 |
| 19 | 0.015 | 0.92 | 0.47 | 0.025 | 0.002 | 24.56 | 1.98 | 1.12 | 0.76 | 0.012 | 0.010 | 0.025 |
| 20 | 0.011 | 1.04 | 0.18 | 0.033 | 0.002 | 18.81 | 1.87 | 0.78 | 0.29 | 0.021 | 0.014 | 0.025 |

| Steel No. | Chemical Composition (mass %) | | Condensed Water Corrosion Resistance | Brazeability | Note |
|---|---|---|---|---|---|
| | 2Si + Ni | Other Element | | | |
| 1 | 2.28 | — | ⊙ | ○ | Example |
| 2 | 4.30 | — | ⊙ | ○ | Example |
| 3 | 1.73 | — | ⊙ | ○ | Example |
| 4 | 4.35 | — | ⊙ | ○ | Example |
| 5 | 2.33 | — | ⊙ | ○ | Example |
| 6 | 3.64 | — | ⊙ | ○ | Example |
| 7 | 1.99 | — | ⊙ | ○ | Example |
| 8 | 2.02 | — | ⊙ | ○ | Example |
| 9 | 1.35 | Ti: 0.01 | ○ | ○ | Example |
| 10 | 1.02 | — | ○ | ○ | Example |
| 11 | 2.94 | Cu: 0.23 | ⊙ | ○ | Example |

TABLE 1-continued

| | | | | | | |
|---|---|---|---|---|---|---|
| 12 | 2.52 | W: 0.10, Ti: 0.03, Mg: 0.0004 | ⊙ | | ○ | Example |
| 13 | 2.73 | Co: 0.41 | ⊙ | | ○ | Example |
| 14 | 2.17 | V: 0.05 | ⊙ | | ○ | Example |
| 15 | 4.63 | Zr: 0.06, B: 0.0005 | ⊙ | | ○ | Example |
| 16 | 2.28 | Ti: 0.04 | ⊙ | | ○ | Example |
| 17 | 3.67 | Co: 0.05, Zr: 0.11 | ⊙ | | ○ | Example |
| 18 | 2.94 | Ti: 0.02, Ca: 0.0013 | ⊙ | | ○ | Example |
| 19 | 2.96 | W: 0.05, V: 0.02, Zr: 0.24 | ⊙ | | ○ | Example |
| 20 | 2.86 | Cu: 0.38, Co: 0.18, REM: 0.01 | ⊙ | | ○ | Example |

The remainder which is different from the constituents described above is Fe and inevitable impurities.
Underlined portions indicate items out of the range of the present invention.

TABLE 2

| Steel No. | C | Si | Mn | P | S | Cr | Mo | Ni | Nb | Al | N | C + N |
|---|---|---|---|---|---|---|---|---|---|---|---|---|
| 21 | 0.018 | 0.78 | 0.25 | 0.028 | 0.004 | 20.04 | 1.82 | 0.81 | 0.35 | 0.013 | 0.017 | <u>0.035</u> |
| 23 | 0.013 | 1.05 | 0.16 | 0.032 | 0.001 | 18.99 | 1.86 | <u>0.07</u> | 0.42 | 0.007 | 0.012 | 0.025 |
| 24 | 0.005 | 0.77 | 0.21 | 0.021 | 0.002 | 18.44 | <u>0.27</u> | 0.61 | 0.33 | 0.018 | 0.009 | 0.014 |
| 25 | 0.007 | 0.98 | 0.27 | 0.025 | 0.002 | <u>15.60</u> | 1.38 | 0.76 | 0.28 | 0.016 | 0.014 | 0.021 |
| 26 | 0.009 | 0.41 | 0.18 | 0.033 | 0.001 | 19.02 | 1.89 | 0.12 | 0.32 | 0.018 | 0.007 | 0.016 |
| 27 | 0.005 | <u>0.22</u> | 0.23 | 0.028 | 0.002 | 21.05 | 1.79 | <u>0.05</u> | 0.26 | 0.048 | 0.008 | 0.013 |
| 28 | 0.008 | 0.92 | 0.33 | 0.026 | 0.002 | 17.02 | 1.95 | 1.21 | 0.22 | <u>0.165</u> | 0.009 | 0.017 |
| 29 | 0.012 | 1.11 | 0.19 | 0.033 | 0.001 | 19.92 | 1.65 | 0.82 | 0.51 | 0.021 | 0.007 | 0.019 |
| 30 | 0.009 | <u>0.35</u> | 0.67 | 0.027 | 0.002 | 19.32 | 1.87 | 0.24 | 0.48 | <u>0.192</u> | 0.012 | 0.021 |
| 31 | 0.005 | <u>0.51</u> | 0.16 | 0.031 | 0.005 | 19.23 | 1.94 | 1.88 | 0.33 | 0.009 | 0.006 | 0.011 |
| 32 | 0.008 | 1.12 | 0.15 | 0.022 | 0.003 | 20.83 | 1.79 | 1.46 | 0.35 | 0.049 | 0.009 | 0.017 |
| 33 | 0.007 | 0.63 | 0.18 | 0.033 | 0.007 | 16.42 | 1.88 | 1.23 | 0.36 | 0.008 | 0.007 | 0.014 |
| 34 | 0.005 | 0.67 | 0.22 | 0.029 | 0.006 | 19.52 | 2.01 | 0.18 | 0.31 | 0.011 | 0.011 | 0.016 |
| 35 | 0.009 | <u>0.37</u> | 0.21 | 0.034 | 0.005 | 18.43 | 1.77 | 0.32 | 0.33 | 0.007 | 0.012 | 0.021 |
| 36 | 0.012 | 0.66 | 0.18 | 0.031 | 0.004 | 19.11 | 1.92 | 0.48 | <u>0.18</u> | 0.012 | 0.011 | 0.023 |
| 37 | 0.011 | 0.42 | 0.18 | 0.028 | 0.005 | 19.41 | 1.88 | 1.99 | 0.32 | 0.005 | 0.009 | 0.020 |
| 38 | 0.005 | 0.47 | 0.17 | 0.026 | 0.004 | 19.32 | 1.93 | 1.26 | 0.27 | 0.003 | 0.007 | 0.006 |
| 39 | 0.007 | 0.46 | 0.21 | 0.030 | 0.006 | 19.13 | 2.13 | 1.54 | 0.35 | 0.004 | 0.008 | 0.015 |
| 40 | 0.008 | 0.44 | 0.16 | 0.032 | 0.007 | 19.47 | 1.67 | 1.83 | 0.34 | 0.004 | 0.011 | 0.019 |
| 41 | 0.006 | 0.61 | 0.15 | 0.030 | 0.006 | 17.17 | 1.62 | 1.67 | 0.32 | 0.005 | 0.008 | 0.014 |
| 42 | 0.008 | 0.52 | 0.21 | 0.033 | 0.005 | 19.12 | 0.83 | 1.56 | 0.33 | 0.006 | 0.007 | 0.015 |
| 43 | 0.005 | 1.78 | 0.19 | 0.031 | 0.006 | 18.88 | 1.89 | 1.25 | 0.35 | 0.005 | 0.009 | 0.014 |
| 44 | 0.007 | 0.43 | 0.18 | 0.030 | 0.007 | 27.22 | 1.77 | 1.92 | 0.34 | 0.006 | 0.008 | 0.015 |
| 45 | 0.009 | 0.51 | 0.15 | 0.032 | 0.005 | 18.79 | 1.23 | 1.88 | 0.32 | 0.005 | 0.007 | 0.016 |

| Steel No. | Chemical Composition (mass %) | | Condensed Water Corrosion Resistance | Brazeability | Note |
|---|---|---|---|---|---|
| | 2Si + Ni | Other Element | | | |
| 21 | 2.37 | — | X | ○ | Comparative Example |
| 23 | 2.17 | — | X | ○ | Comparative Example |
| 24 | 2.15 | — | X | ○ | Comparative Example |
| 25 | 2.72 | — | X | ○ | Comparative Example |
| 26 | <u>0.94</u> | — | X | ○ | Comparative Example |
| 27 | <u>0.49</u> | Ti: 0.02, Ca: 0.0013 | X | ○ | Comparative Example |
| 28 | 3.05 | — | ⊙ | X | Comparative Example |
| 29 | 3.04 | <u>Ti: 0.14</u> | ⊙ | X | Comparative Example |
| 30 | <u>0.94</u> | Ti: 0.03 | X | X | Comparative Example |
| 31 | 2.90 | — | ⊙ | ○ | Example |
| 32 | 3.70 | — | ⊙ | ○ | Example |
| 33 | 2.49 | Ti: 0.03 | ⊙ | ○ | Example |
| 34 | 1.52 | Co: 0.12 | ⊙ | ○ | Example |
| 35 | 1.06 | — | X | ○ | Comparative Example |
| 36 | 1.80 | — | X | ○ | Comparative Example |
| 37 | 2.83 | — | ⊙ | ○ | Example |
| 38 | 2.20 | V: 0.16 | ⊙ | ○ | Example |
| 39 | 2.46 | Ti: 0.06, B: 0.0005, Ca: 0.0004 | ⊙ | ○ | Example |
| 40 | 2.71 | W: 0.08, Zr: 0.24, REM: 0.03 | ⊙ | ○ | Example |
| 41 | 2.89 | — | ⊙ | ○ | Example |
| 42 | 2.60 | — | ⊙ | ○ | Example |
| 43 | 4.81 | — | ⊙ | ○ | Example |

TABLE 2-continued

| 44 | 2.78 | — | ⊙ | ○ | Example |
| 45 | 2.90 | Cu: 0.35, Co: 0.13 | ⊙ | ○ | Example |

The remainder which is different from the constituents described above is Fe and inevitable impurities.
Underlined portions indicate items out of the range of the present invention.

As indicated in Tables 1 and 2, the examples of the present invention, that is, steel Nos. 1 through 20, 31 through 34, and 37 through 45 were all excellent in terms of corrosion resistance to condensed water and brazeability.

In particular, steel Nos. 1, 2, 4 through 8, 11, 12, 14 through 20, 32 through 34, 41, and 43, whose Si content was more than 0.60%, and steel Nos. 3, 13, 31, 37 through 40, 42, 44, and 45, whose Ni content was more than 0.80% while the Si contents thereof were 0.60% or less, were particularly excellent in terms of corrosion resistance to condensed water.

On the other hand, steel No. 21, which did not satisfy relational expression (1), that is, out of the range of the present invention, failed in terms of corrosion resistance to condensed water. In addition, steel Nos. 23, 24, 25, 35, and 36, which were out of the range of the present invention in terms of the content of at least one of Si, Cr, Mo, Ni, and Nb, steel No. 26, which did not satisfy relational expression (2), and steel No. 27, which did not satisfy relational expression (2) and was out of the range of the present invention in terms of the contents of Si and Ni, failed in terms of condensed water corrosion resistance.

In addition, steel Nos. 28 and 29, which were out of the range of the present invention in terms of the content of at least one of Al and Ti, failed in terms of brazeability. In addition, steel No. 30, which was out of the range of the present invention in terms of the contents of Si and Al and did not satisfy relational expression (2), failed in terms of corrosion resistance to condensed water and brazeability.

INDUSTRIAL APPLICABILITY

The ferritic stainless steel according to aspects of the present invention can preferably be used as a material for an exhaust heat recovery device or an exhaust gas recirculation device such as an EGR cooler which is exposed to condensed water generated from the exhaust gas of an automobile.

The invention claimed is:
1. A ferritic stainless steel having a chemical composition consisting of, by mass %,
C: 0.025% or less,
Si: 0.40% to 2.0%,
Mn: 0.05% to 1.5%,
P: 0.05% or less,
S: 0.01% or less,
Cr: 16.0% to 30.0%,
Mo: 0.60% to 3.0%,
Ni: 0.10% to 2.5%,
Nb: 0.20% to 0.80%,
Al: 0.001% to 0.025%,
N: 0.025% or less,
optionally, one, two, or more selected from:
Cu: 0.01% to 1.0%,
W: 0.01% to 1.0%,
Co: 0.01% to 1.0%,
Ti: 0.01% to 0.10%,
V: 0.01% to 0.50%,
Zr: 0.01% to 0.30%,
B: 0.0003% to 0.005%,
Ca: 0.0003% to 0.003%,
Mg: 0.0003% to 0.003%,
one or more REMs (rare earth metals): 0.001% to 0.10%,
and the balance being Fe and inevitable impurities, wherein
relational expressions (1) and (2) below are satisfied:

$$C+N \leq 0.030\% \qquad (1),$$

$$2Si+Ni \geq 1.0\% \qquad (2),$$

wherein in relational expressions (1) and (2), C, N, Si, and Ni each denote the contents by mass % of the corresponding elements,
wherein when a brazing treatment is performed by applying 1.2 g of a brazing filler metal BNi-5 having a composition Ni-19Cr-10Si to one end surface of two overlapped steel sheets of the ferritic stainless steel and by heating the two overlapped steel sheets at a temperature of 1170° C. for 600 seconds in a vacuum environment of $10^{-2}$ Pa, a penetration distance of the brazing filler metal is 50% or more of a lapping length of the two overlapped steel sheets, and
wherein when a unit test cycle in which a whole test piece is subjected to full immersion in a solution containing 200 ppm Cl$^-$+600 ppm SO$_4^{2-}$ and having a pH of 8.0, holding at a temperature of 80° C., immersion for 24 hours while the solution is vaporized in 24 hours, and being held in a furnace at a temperature of 250° C. for 24 hours, is performed four times, a maximum corrosion depth is less than 100 μm.
2. The ferritic stainless steel according to claim 1, wherein the steel is steel for an exhaust heat recovery device or exhaust gas recirculation device of an automobile.

* * * * *